(12) United States Patent
Liu

(10) Patent No.: US 7,242,115 B2
(45) Date of Patent: Jul. 10, 2007

(54) UNIVERSAL POWER CONVERTER

(76) Inventor: David Liu, 235 Chung-Ho, Box 8-24, Taipei (TW)

( * ) Notice: Subject to any disclaimer, the term of this patent is extended or adjusted under 35 U.S.C. 154(b) by 502 days.

(21) Appl. No.: 10/923,758

(22) Filed: Aug. 23, 2004

(65) Prior Publication Data

US 2005/0248332 A1   Nov. 10, 2005

(51) Int. Cl.
*G05F 3/06*   (2006.01)
(52) U.S. Cl. .................................. 307/151; 307/150
(58) Field of Classification Search ............... 307/150, 307/151
See application file for complete search history.

(56) References Cited

U.S. PATENT DOCUMENTS 6,376,938 B1 *  4/2002  Williams .................... 307/150

2006/0129253 A1 *  6/2006  Menas et al. ................ 700/22
2006/0163948 A1 *  7/2006  Kim et al. ................... 307/18

* cited by examiner

*Primary Examiner*—Robert L. Deberadinis

(57) ABSTRACT

A universal power converter comprises a body and a circuit module. The circuit module includes a power converter circuit; the power converter circuit being a power supply and charging circuit of a power supply; and a voltage adjusting circuit; the voltage adjusting circuit including a main controller; the main controller being installed with a plurality of output ports; each output port being serially connected to a respective transistor and a specific resistor value; each resistor value representing a specific output voltage which is feedback to the power converter circuit; the main controller serving for automatically opening or closing a selected voltage and for driving the signals from the data display screen and the actuating switch.

10 Claims, 4 Drawing Sheets

UNIVERSAL POWER CONVERTER

FIELD OF THE INVENTION

The present invention relates to power converters, and particular to a universal power converter, wherein the output voltage is selectable for matching a required device, and the power converter has a display screen for viewing the adjustment of voltage. Thereby, no fault occurs in the operation. All the components are contained within the converter without any plug-in components.

BACKGROUND OF THE INVENTION

Power converters are connected to an AC or a DC power source for supplying power to an electronic device for a longer time or for supplying power to batteries in the electronic device. However, specifications of the power converters are dependent on the manufacturers so that it is often that different power converters are not compatible. Thereby, the user must carry a dedicated power converter as the electronic device is used outdoors.

Referring to FIG. 4, a prior art is disclosed to improve the inconvenience in the prior art. In that, a connector A is coupled between a power converter and an external device. The resistors or pins B (PIN) are embedded into the connector A. The output voltage of the power converter is changed by changing the resistor. The resistor can be a plug-in type which can be inserted into the connector. Thereby, the user is unnecessary to carry a plurality of power converters.

However, the prior art way has the following disadvantages. In the current commercial notebook, there are at least six voltages are used, which are 15V, 16V, 18V, 19V, 20V, 24V. If it is desired to configure the connectors to present these voltage values, costs in design and development are increased. Moreover, the user must store many resistors so as to make an inconvenience to the users. Furthermore, the adjustment of the resistor values cannot present immediately. This will cause that the device cannot be used or even the device is destroyed.

SUMMARY OF THE INVENTION

Accordingly, the primary object of the present invention is to provide a universal power converter, wherein the output voltage is selectable for matching a required device, and furthermore the power converter has a display screen for viewing the adjustment of voltage. Thereby, no fault occurs in the operation. All the components are contained within the converter without any plug-in components.

To achieve above object, the present invention provide a universal power converter which comprises a body; the body having a front surface, a back surface, a top surface, a bottom surface and two lateral surfaces; the front surface having a first connecting wire and the bottom surface having a second connecting wire; a circuit module contained in the casing; one end of the first connecting wire and one end of the second connecting wire being connected to the circuit module; another end of the first connecting wire being connected to an input of a power supply; another end of the second connecting wire being connected to an external device; a voltage adjusting button, a data display screen, and an actuating switch which are wired-connected to the circuit module being installed on the top surface. The circuit module includes a power converter circuit; the power converter circuit being a power supply and charging circuit of a power supply; and a voltage adjusting circuit; the voltage adjusting circuit including a main controller; the main controller being installed with a plurality of output ports; each output port being serially connected to a respective transistor and a specific resistor value; each resistor value representing a specific output voltage which is feedback to the power converter circuit; the main controller serving for automatically opening or closing a selected voltage and for driving the signals from the data display screen and the actuating switch.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
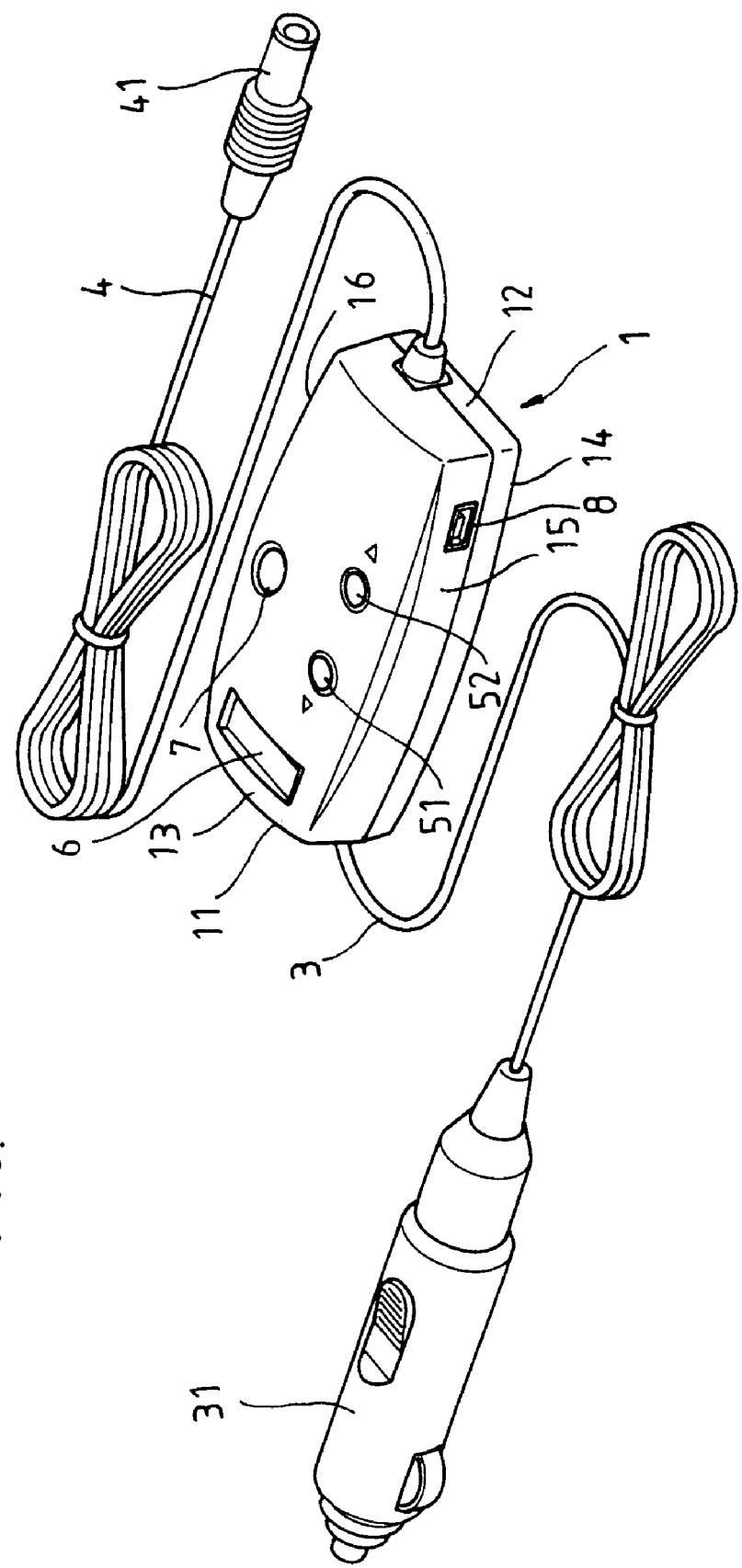
FIG. 1 is a perspective view of the present invention.
Figure 2:
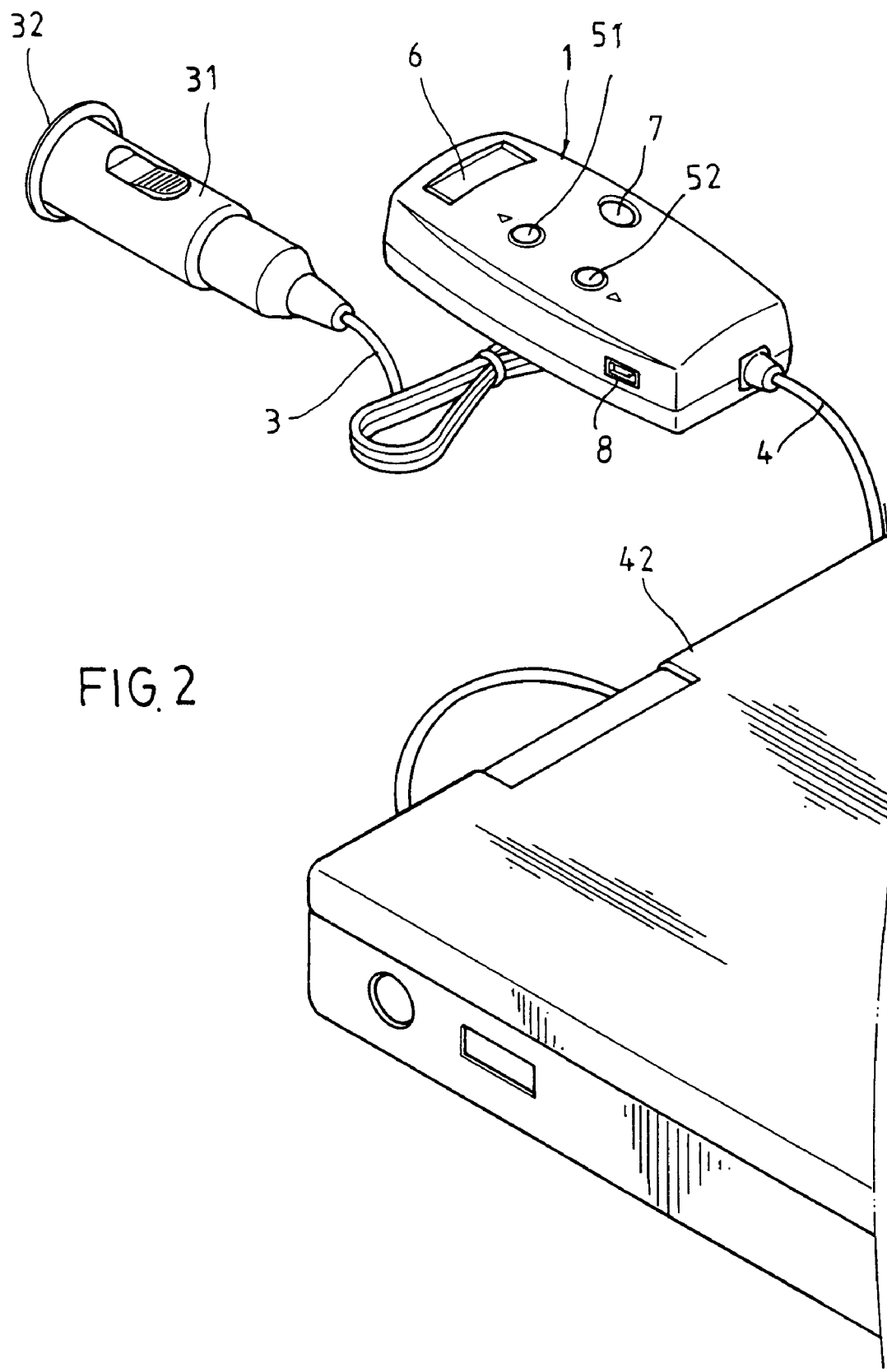
FIG. 2 is one application of the present invention.

With reference to FIGS. 1 and 2, the perspective view of the present invention is illustrated. The power converter of the present invention includes a body 1. The body 1 is a closed casing. A circuit module 2 is contained in the casing, see FIG. 3. The body 1 has a front surface 11, a back surface 12, a top surface 13, a bottom surface 14 and two lateral surfaces 15, 16. The front surface 11 has a first connecting wire 3 and the bottom surface 14 has a second connecting wire 4. One end of the first connecting wire 3 and one end of the second connecting wire 4 are connected to the circuit module 2. Another end of the first connecting wire 3 is connected to an input of a power supply. Another end of the second connecting wire 4 is connected to an external device.

For the embodiment illustrated in FIG. 2, a first connecting port 31 serves to adapt the first connecting wire 3 to the power input. The first connecting port 31 is, for example, a plug of a car igniter which capable of be inserted into the receptacle 32 of a car igniter. Thereby DC current can be supplied. A second connecting port 41 serves to connect the second connecting wire 4 to the external device. With reference to FIG. 2, the external device may be a notebook computer 42. However in the present invention, the power input can be an AC power supply other than DC power supply. For example, it is a personal digital assistant (PDA), a table top computer, a servo, a mobile phone, or other consumer devices.

The top surface 13 includes a voltage adjusting button 5, a data display screen 6, and an actuating switch 7 which are wired-connected to the circuit module 2. It is preferred that the voltage adjusting button 5 has two buttons 51, 52 for adjusting the voltage to a higher or a lower value. The data display screen 6 is an LCD display screen which is actuated by a driving program of a circuit module 2. The actuating switch 7 is a key matrix circuit (referring to FIG. 3) which includes a plurality of sub-switches 71 arranged as a matrix.

The lateral surface 15 of the body 1 can be installed with a USB or an interface port 8 of IEEE 1394. Through the wired power supply of the circuit module 2, the periphery IT products can be used.

Figure 3:
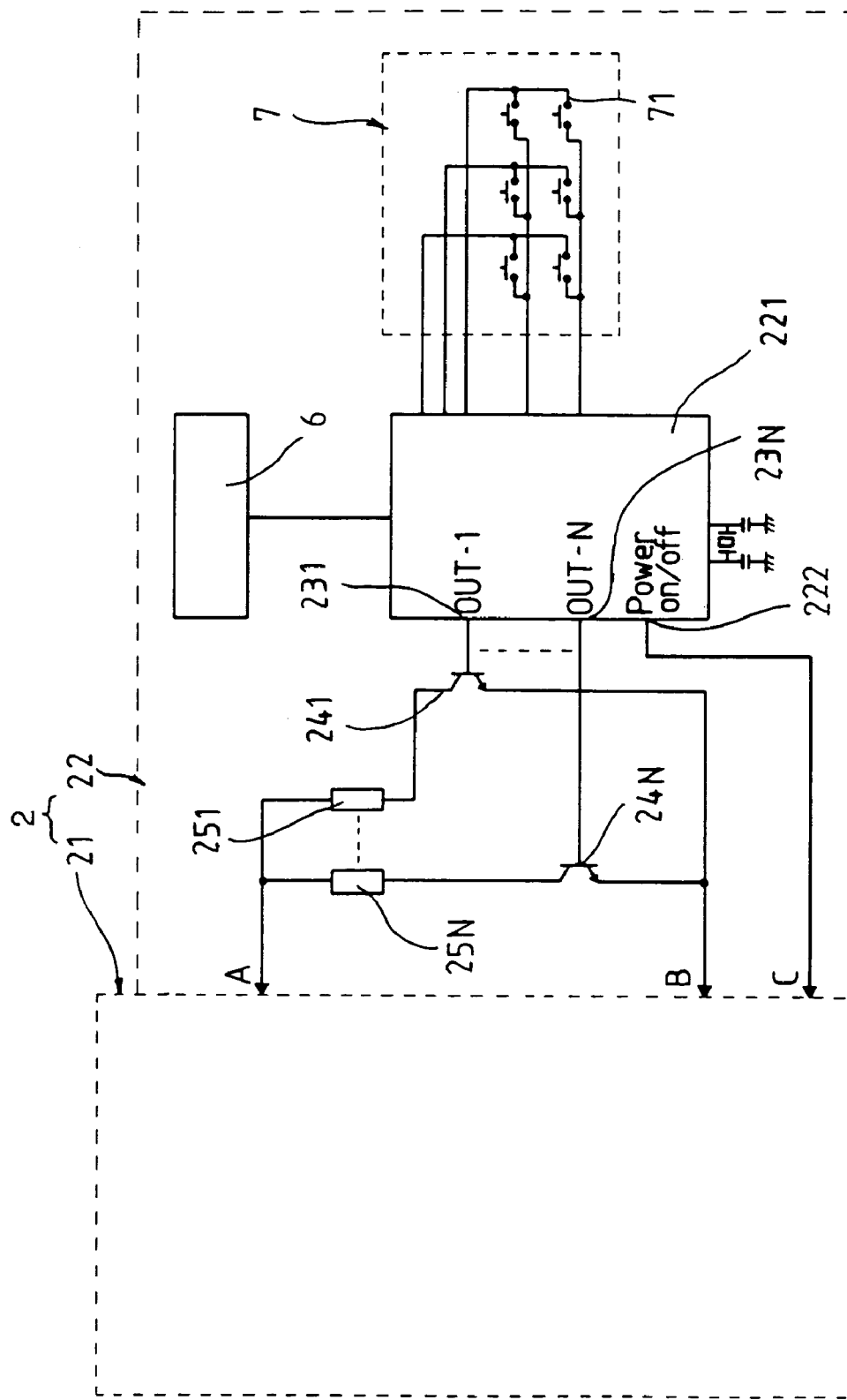
FIG. 3 shows the circuit arrangement of the present invention.
Figure 4:
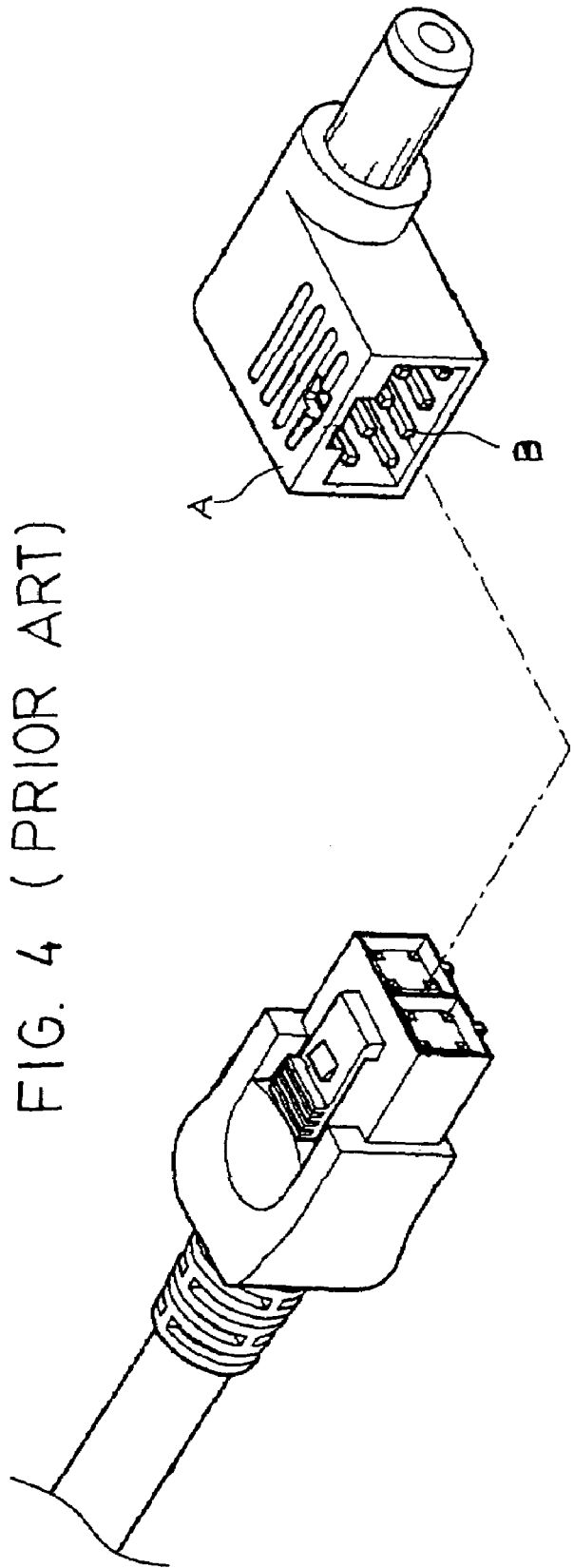
FIG. 4 shows the structure of a prior art-power converter.

With reference to FIG. 3, the circuit module 2 includes a power converter circuit 21 and a voltage adjusting circuit 22. The power converter circuit 21 may be a general used power supply and charging circuit (not shown). The voltage adjusting circuit 22 includes a main controller 221. The main controller 221 is installed with a plurality of output ports 231–23N. Each output port 231~23N are serially connected to a respective transistor 241–24N 24N and a specific resistor value 251~25N. Each resistor value 251 to 25N represents a specific output voltage which can be feedback to the power converter circuit 21. The main controller 221 further includes a power On/Off port 222 for automatically opening or closing a selected voltage. Besides the main controller 221 serves to drive the signals from the data display screen 6 and the actuating switch 7.

The operation of the present invention will be described herein. When the actuating switch 7 is pressed once, the main controller 221 detects the condition. Then, the main controller 221 will provide a reference voltage to be displayed on the data display screen 6 (LCD). Then the user selects a desired voltage by the voltage adjusting buttons 51, 52. Then the main controller 221 will actuate the voltage output ports 231 to 23N. The voltage output ports 231 to 23N connected by the transistors (or FETs) 241 to 24N will select automatically the respective resistors 251 to 25N and conduct the respective resistors. Then the power switch port 222 will close automatically so as to assure that the above action is not induced by external factors. When the main controller 221 receives the signal indicating that the user has pressed the actuating switch 7 again, the main controller 221 will assure the selected voltage and processing flow. The power switch port 222 will actuate again for outputting the selected voltage. The power is transferred to the external device 42 through the second connecting wire 4. Thereby the supply voltage can be set and outputted rapidly and accurately. Thereby by the safety mechanism of the actuating switch 7 and the power switch port 222, the non-manual faults can be avoided. Moreover, the user can view related data through an LCD display screen so as to understand the selected output voltage and other data.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A universal power converter comprising:
    a body; the body having a front surface, a back surface, a top surface, a bottom surface and two lateral surfaces; the front surface having a first connecting wire and the bottom surface having a second connecting wire;
    a circuit module contained in the casing; one end of the first connecting wire and one end of the second connecting wire being connected to the circuit module; another end of the first connecting wire being connected to an input of a power supply; another end of the second connecting wire being connected to an external device;
    a voltage adjusting button, a data display screen, and an actuating switch which are wired-connected to the circuit module being installed on the top surface;
    wherein the circuit module includes
    a power converter circuit; the power converter circuit being a power supply and charging circuit; and
    a voltage adjusting circuit; the voltage adjusting circuit including a main controller; the main controller being installed with a plurality of output ports; each output port being serially connected to a respective transistor and a specific resistor value; each resistor value representing a specific output voltage which is feedback to the power converter circuit; the main controller serving for automatically opening or closing a selected voltage and for driving the signals from the data display screen and the actuating switch.

2. The universal power converter as claimed in claim 1, wherein the voltage adjusting button has two buttons for adjusting the voltage to a higher or a lower value.

3. The universal power converter as claimed in claim 1, wherein the data display screen is an LCD display.

4. The universal power converter as claimed in claim 1, wherein actuating switch has a key matrix circuit which includes a plurality of sub-switches arranged as a matrix.

5. The universal power converter as claimed in claim 1, wherein a first connecting port serves to adapt the first connecting wire to the power input.

6. The universal power converter as claimed in claim 1, wherein a second connecting port serves to connect the second connecting wire to the external device.

7. The universal power converter as claimed in claim 1, wherein the power input connected to the first connecting wire is one of a DC input and an AC input.

8. The universal power converter as claimed in claim 1, wherein the external device is one of a personal digital assistant, a table top computer, a servo, and a mobile phone.

9. The universal power converter as claimed in claim 1, wherein the actuating switch is installed on the lateral surface of the body.

10. The universal power converter as claimed in claim 1, wherein the lateral surface of the body is installed with one of a USB and an interface port of IEEE 1394; through the wired power supply of the circuit module, the periphery IT products can be used.

* * * * *